July 11, 1939.  A. D. EDGINGTON  2,165,888
STRAW SUPPORT FOR THRESHERS
Filed Jan. 16, 1937  2 Sheets-Sheet 1
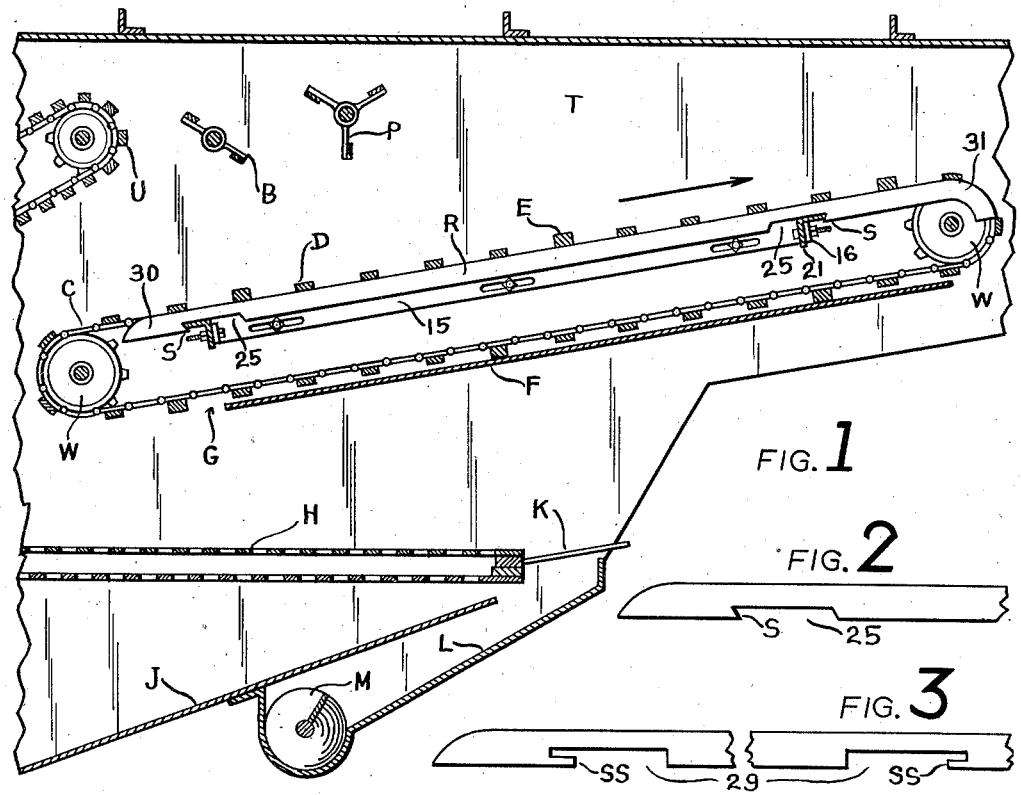
FIG. 1
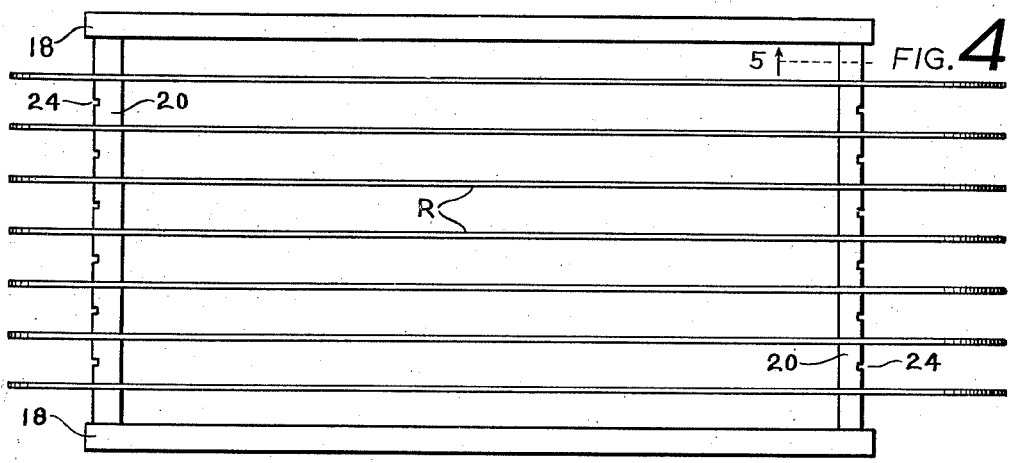
FIG. 2
FIG. 3
FIG. 4
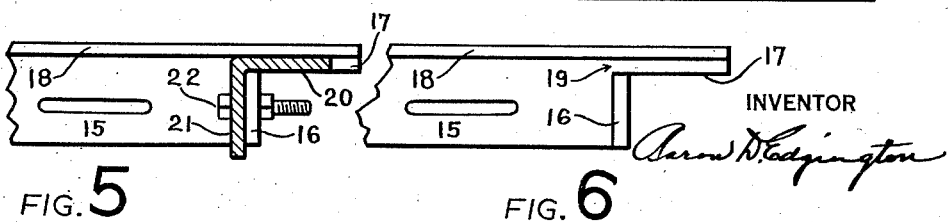
FIG. 5
FIG. 6
INVENTOR
Aaron D. Edgington July 11, 1939.  A. D. EDGINGTON  2,165,888
STRAW SUPPORT FOR THRESHERS
Filed Jan. 16, 1937   2 Sheets—Sheet 2
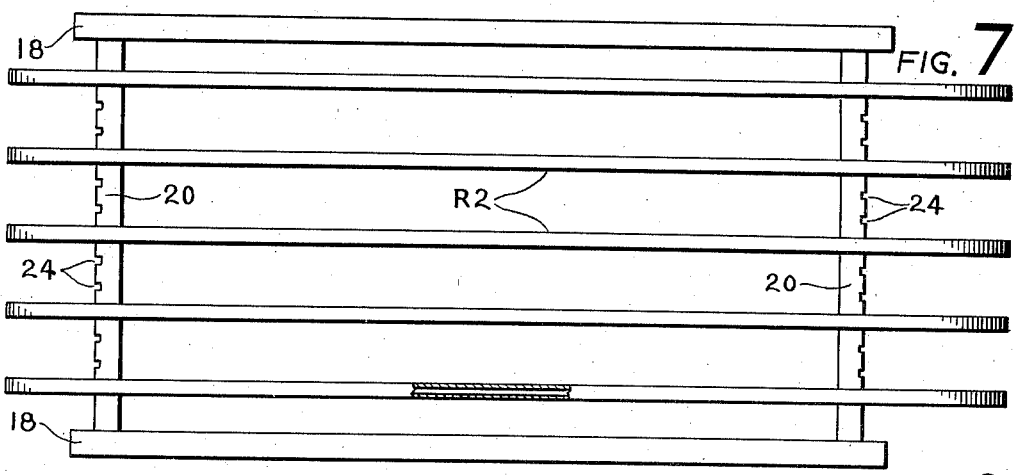
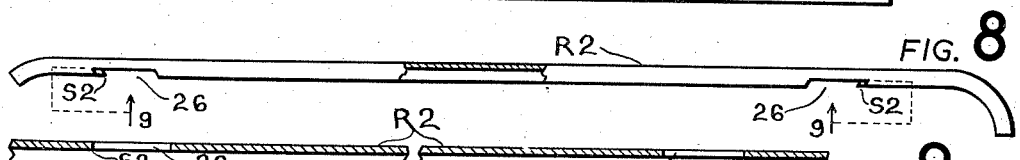
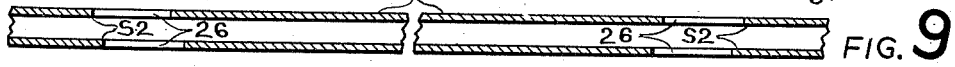
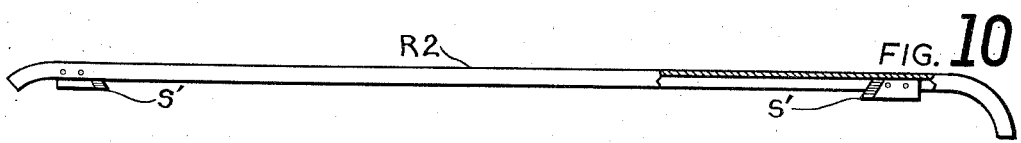
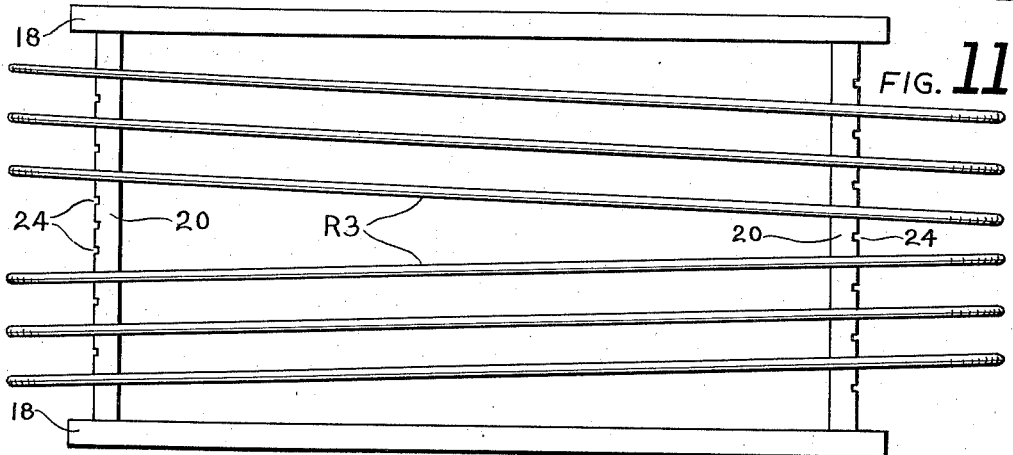
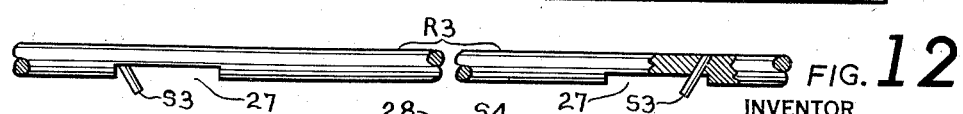
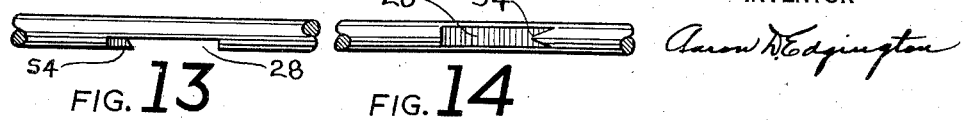
INVENTOR
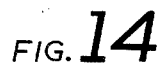

Patented July 11, 1939

2,165,888

UNITED STATES PATENT OFFICE 2,165,888

STRAW SUPPORT FOR THRESHERS

Aaron D. Edgington, Cheney, Wash., assignor to Cheney Weeder Company, Cheney, Wash., a corporation of Washington Application January 16, 1937, Serial No. 120,918

10 Claims. (Cl. 130—21)

The present invention relates to certain new and useful improvements in a Straw support for threshers and is particularly directed to instrumentalities cooperating with the traveling straw carrier to insure a maximum discharge by the straw carrier, and thereby preclude such refuse from overloading the cleaning screens.

In districts where grains are grown on large acreage, it is the general custom to merely head the grain and leave the major portion of the straw standing in the field. This procedure affords a more rapid harvesting and threshing by the conventional combine, due to the lesser amount of straw passing through the threshing mechanism. The short length of straw cut presents the predicament that considerable of this short straw will drop through the upper flight of the usual straw carrier, with the result that it either drops on through with the grain to the cleaning screens, or else it lodges on the return flight of the straw carrier and is carried in reverse direction back into the thresher where it not only interferes with the operation of the straw carrier but also fails to be discharged except by escape onto the cleaning screens, in which situation it greatly reduces the efficiency of the latter by overloading and clogging the same.

By means of my improved construction, the straw and trash which is initially separated from the grain, is maintained upon the upper flight of the straw carrier and carried directly out of the thresher. The invention precludes such refuse from reaching the cleaning screens, and thereby eliminates clogging of the screens, otherwise caused by such refuse, and also saves such grain as would otherwise ride out on such refuse when accumulated upon the screens.

My invention can be applied to any conventional thresher employing a traveling straw carrier, and embodies a substructure comprising a frame carrying runners disposed longitudinally of the path of travel of the straw carrier and immediately below the top flight thereof and either in contact with or else sufficiently near to the cross slats of the straw carrier to form therewith a reticulated refuse support through which the average refuse will not pass to the cleaning screens therebelow.

The invention resides in providing an expansible frame having a number of longitudinal runners carrying spurs directed towards each other and adapted to fit under and outside of the end members of the frame, in such manner that when the frame is expanded, the runners are drawn taut and securely held in fixed relation to the frame. By means of my improved construction, it is conveniently practical to utilize inexpensive strap iron runners and securely lock them to the frame so that they are rigidly held on edge and taut, thereby providing a particularly rigid construction made from light weight material otherwise unsuited for such purpose.

The improved construction can be assembled and disassembled quickly and easily, which minimizes the cost of production; and greatly adds to the convenience of the user, when disassembly is required for any reason.

The accompanying drawings illustrate the principle of my invention and show various modes of practical embodiments.

Figure 1 is a vertical longitudinal section through the rear of a thresher, showing my invention in operative position.

Figure 2 is an enlarged fragmentary detail showing one end of the runner shown in Fig. 1.

Figure 3 shows a modification of Figure 2.

Figure 4 shows the invention separate.

Figure 5 is an enlarged section on the line 5 of Figure 4.

Figure 6 is an enlarged detail showing the end of the side rail shown in Figure 5.

Figure 7 shows the invention with inverted channel runners.

Figure 8 is a side view of one of the channel runners shown in Figure 7.

Figure 9 is a fragmentary section on the line 9—9 of Fig. 8.

Figure 10 shows a modification of Figure 8.

Figure 11 shows the invention with rod runners obliquely disposed.

Figure 12 is an enlarged fragmentary view disclosing one form of spurs on the rod runners of Figure 11.

Figure 13 is an enlarged fragmentary view disclosing another form of spurs on the rod runner of Figure 11.

Figure 14 is an underside view of Figure 13.

In carrying out my invention, I employ an open frame embodying side rails 18 spaced apart parallel and joined by end members 20 in such a manner that the distance between the end members can be varied. As for instance, as best seen in Figures 5 and 6, the side rails are formed from angle iron having two wings 15 and 18, the wing 15 is longitudinally cut at each end and each cut portion is bent at a right angle to form an ear 16 projecting under the wing 18. The cut is so made that a space 19 is left between each ear 16 and the wing 18, and preferably the cut is made so as to leave a flange 17 on each projecting end of the wing 18 and thereby maintain rigidity of the projecting ends. The described side rails are positioned with the wings 18 directed towards each other; and end members consisting of angle iron are bolted to the ears 16 at each end of each side rail with the wing 20 of each end member directed outwardly with respect to the frame. The spaces 19 afford a passage for the wing 20 of the end members and hold them between the wing 18 of the side rails and the ear 16 thereof, so that the wing 20 will have a true sliding movement by means of the bolts 22 which pass through the wings 21 and the ears 16, and serve to draw one end member away from the other end member. One end member may be rigid and the other movable, but it is desirable to make both end members movable and thereby avoid the necessity of making the side rails one with a right and the other with a left ear.

The runners which are generically referred to as R are locked to the end members by means of spurs which engage under the wings 20 of the two end members. The spurs which are generically referred to as S, are formed near the two opposite ends of each runner, and project towards each other. It is preferable that the discharge end of each runner be curved to follow the downward turn of the straw carrier, as is indicated at 31 in Figure 1, so as to provide support for the straw until the moment of discharge. The opposite end of each runner should be curved as indicated at 30, to avoid hanging up on the slats of the traveling straw carrier.

Figure 2 shows an enlarged detail of one of the spurs S shown in Figure 1. As here shown the runner R, which is of strap iron, is notched out at 25, and the outer end of the notch is undercut to form the spur S. As shown in Figure 1, the two spurs extend obliquely downward towards each other, and being undercut, they effectively hook over the respective wings 20 of each end member when one of the latter is slightly loosened; and the runners can be drawn down to seat firmly on the end members by drawing one end member away from the other by means of the bolts 22, which will also draw the runner taut as well as hold it in securely locked position and on edge so that it will support considerable weight without sagging.

The runners R being taut, they are very rigid and will not be distorted by severe usage which would otherwise distort light weight narrow strap iron of which they are preferably made. It will be seen that the device can be assembled quickly and easily, and that any runner can with facility be removed and replaced when required for any reason.

Any required number of runners may be employed on a single frame, and the runners may be parallel to the frame, or they may be oblique to the frame. To facilitate assembly, and to assure orderly arrangement of the runners upon the frame, I prefer to provide a series of spaced notches 24 on the edge of the wing 20 of each end member, and to engage the spurs in these notches, to thereby assure proper alignment of the runners according to the selected arrangement; and to securely hold the runners against lateral movement with respect to the frame. In Figures 4, 7 and 11, I have shown the end members as each provided with thirteen notches, which number has been found most practical in practice, because it affords ample facilities for varying the number of runners and the arrangement thereof.

Figure 4 shows seven runners, one in each alternate notch, and arranged parallel to the frame and parallel to each other. It is seldom necessary to provide more than seven runners, but should occasion require it is a simple matter to lock a runner in each and every notch, which will fully suffice for the most extreme necessity ever encountered in practice. It will be seen that in the arrangement shown in Figure 4, the second, fourth and sixth runners may be omitted, leaving a regular arrangement of the other four runners; or, the other four runners may be omitted, leaving a regular arrangement of the second, fourth and sixth runners in the positions shown in Figure 4.

Figure 7 shows five runners regularly arranged parallel in the same frame as shown in Figure 4.

Hence it will be seen that the thirteen notches provide for a regular arrangement of either, three, four, five, seven or thirteen runners, in parallel relation to the frame and parallel to each other, and that the notches are of advantage in regularly arranging the desired number of runners upon the frame. It will also be seen that the notches assure that the runners will remain free from side slipping otherwise occasioned by severe usage, or by unattended looseness of the bolts 22.

Where the device is installed with the runners in absolute contact with the cross slats of the straw carrier, it is desirable to arrange the runners oblique to the frame, to thereby broaden the path of wear of the runners upon the slats.

Figure 11 shows six runners arranged on the same frame as shown in Figure 4. In Figure 11, the runners are arranged in two groups of three each, the runners of each group being parallel to each other and oblique to the frame and oblique to the runners of the other group; and all of the runners converge towards the median line at the end where the straw is discharged. This arrangement not only distributes the previously mentioned wear upon the slats, but also, since the runners converge towards the center of the path of travel, the straw is directed away from the sides of the thresher and a more free movement of the straw mass is afforded. It will be apparent that when the second and fifth runners in Figure 11 are removed there will be a regular arrangement of the remaining four runners. Plainly, these four runners can also be arranged in a zig-zag fashion, by merely moving the left end of each of the outside runners, to the respective notches occupied by the left ends of the second and fifth runners removed from the frame.

It will also be appreciated that the six runners shown in Figure 11 can be orderly arranged in a zig-zag fashion by merely moving the second runner and the fifth runner one notch nearer to the center of the left end member and also moving the right end of each of these runners one notch farther from the center of the right end member. The six runners will then be orderly arranged in a zig-zag fashion, oblique to each other and oblique to the frame and the path of wear of the runners will be distributed substantially throughout the length of the cross slats of the straw carrier and wear will be uniform instead of in channels.

The liberal amplitude and utility of the thirteen notches 24 is readily apparent.

The strap iron runners R are preferable, because of low cost and simplicity in manufacture;

however, it will be readily appreciated that the runners may be made from various other materials. Figures 7, 8, 9 and 10 show runners R2 made of small light weight channel metal. As shown in Figures 8 and 9, each leg of the channel metal is provided with two spurs S2 identical with those described with relation to Figures 1 and 2 and the spurs on one leg of the channel are spaced the same distance apart as though strap iron runners were used, and these spurs engage in the notches 24. The spurs on the other leg of the channel are spaced outwardly an amount equal to the depth of the notches 24, so that these spurs will engage the edge of the end member 20 when the closer spaced spurs on the other leg of the channel engage the bottom of the notches 24, thus providing equal pull on all of the spurs S2 when the frame is extended as before described. If desired, the spurs S2 may be located in the same position on each leg of the channel, in which case they may be engaged with the edge of the end member 20, or else in notches spaced corresponding to the spacing of the legs of the channel metal.

As shown in Figure 10, the spurs may be fashioned as blocks S' fitted between the legs of the channel metal and rigidly secured as by riveting, or otherwise; one end of each block being slanting, and if thickness requires this end may be suitably beveled to fit in a narrow notch such as 24. The channel metal is here shown as rectangular in cross section; however, it is conveniently practical to fashion the channel runners from sheet metal bent U shaped in cross section and with legs spaced close together so that the spur block S' may be made from a piece of strap iron of the thickness fitting the notches 24, in which case the manufacturing of the spur blocks S' would be materially simplified.

Figures 11, 12, 13 and 14 shows runners made of round rods which are notched out as shown at 27 in Figure 12, and the spurs S3 are formed by pins set obliquely into the rod where it is notched out; or, as shown in Figures 13 and 14, a spur S4 may be integral with the rod and project into the notched out portion 28, the sides of the spur S4 being suitably tapered and the edge thereof properly undercut so as to engage under the end member 20 in the previously described manner.

The spurs have been described as obliquely disposed with relation to the runners, and this is preferable, for the reason that as the parts wear, the slant of the spur will urge the runner down to seat upon the end members 20 when the latter are properly bolted. Furthermore, the described slant on the spurs readily accommodates itself to the imperfections and variations in thickness which are always to be expected in rough material such an angle iron. However, the invention can be carried out by employing runners having spurs such as shown at SS in Figure 3. The spur SS is also undercut, but the undercut is parallel with the edge of the runner, and the spur is in form of a tongue projecting into the notched portion 29.

In the utilization of my invention it is installed as supplemental equipment in the conventional thresher, or combine, in the manner illustrated in Figure 1. This figure shows a longitudinal, vertical section of the discharge end of the threshing mechanism, having side walls T which carry an endless straw carrier comprising chains C spaced apart by a series of slats D and trained over sprockets W turned by suitable power. The conveyor U delivers the straw and loose grain to the straw carrier, and the rotating member B and P are employed for agitation. The straw carrier tavels in the direction of the arrow and discharges the straw at the end 31. Grain dropping through the straw carrier is caught by the pin F and is dragged back by means of occasional slats E which are higher than the others. This grain leaves the pan at G, and reaches the screens at H, through which the grain passes to a pan J where it finds its way to an auger not here shown, the conventional fan for providing an air blast being also not shown. Most of the chaff is blown away and loose straw passes out over the grating K through which any partially threshed heads pass to the pan L where they move to the auger M which carries them back to the threshing mechanism.

In the absence of my invention, considerable straw and trash drops through the upper flight of the straw carrier and moves backward on the lower flight of slats where it either clogs up, or else escapes to the separator screen or cleaning screen which ever one or both may be situated at H. This refuse overloads the screen and greatly reduces its efficiency, with the result that kernels of grain pass out with the blanket of refuse and are lost in the field; and in threshers not provided with the grating K, the loss of grain under such conditions is even greater. Straw which fails to find its way through the bottom flight of the straw carrier has no means of escape and will accumulate until it either clogs the straw carrier, thus necessitating manual removal; or else it will be partially distingrated by the moving parts and be disgorged onto the screen H, usually in quantities at each occasion, thus constituting an obstacle to the function of the screen.

To overcome these inaptitudes, my invention is mounted immediately beneath the upper flight of the straw carrier, with the side rails 18 forming a supporting track for the chains C, and with the runners R in close proximity to the cross slats D of the straw carrier. It is not necessary that the runners be in contact with the slats D but they may be if so desired. Preferably, the runners extend practically full length of the straw carrier, and it is desirable that the discharge end of each of the runners be provided with a curved end 31 which follows the downward turn of the straw carrier, so as to assure that the straw will be supported to the moment of discharge.

With the invention thus installed, the straw is adequately supported and does not fall through the top flight of the straw carrier; the screens at H are relieved of overloading otherwise due to refuse, and the kernels of grain can pass through the screens more readily, thus assuring a more thorough separation of the grain from the refuse and a substantial saving of grain which would otherwise pass out with the refuse and be lost.

The proper number of runners are employed according to the condition of the straw mass, and the runners are arranged in the mode best suited for the particular condition. When occasion requires, the runners can be rearranged, replaced, or more runners added, by opening the chains C, and loosening the two bolts 22, whereupon the spurs can with facility be disengaged, and the runners removed and replaced, quickly and easily.

In the present disclosure, I claim as my invention:

1. A straw support comprising end members each having a projecting edge, one of said end members mounted for movement away from the other end member, a series of runners supported upon said members and projecting outwardly therefrom, each runner having a pair of notches spaced apart along the runner and longitudinally parallel therewith, each notch being of sufficient length to span the width of the respective end member, a spur in each of said notches, each spur engaging under the edge of its corresponding end member, and said end members spaced apart and holding said spurs engaged therewith and with the longitudinal edge of each notch seating upon its respective end member.

2. A straw support comprising end members each having a projecting edge, one of said end members mounted for movement away from the other end member, a series of runners supported upon said end members, a spur near each end of each runner, the spurs on each runner being spaced apart along the runner and oppositely disposed intermediate the ends of the runner, each of said end members having a series of notches on its edge, each of said spurs disposed in one of said notches and engaged under the edge of the respective end member, said end members spaced apart to hold said spurs engaged in said notches, and the terminal ends of said runners extending outwardly beyond said end members.

3. A straw support comprising end members each having an outwardly projecting edge, one of said end members mounted for movement away from the other end member, a series of runners supported upon said end members and projecting outwardly therefrom, each runner having a pair of notches spaced apart along the runner and longitudinally parallel therewith, each notch being of sufficient length to span the width of the respective end member, a spur at the outer end of each of said notches, each spur engaging under the outwardly projecting edge of its corresponding end member, and said end members spaced apart and holding said spurs engaged therewith and with the longitudinal edge of each notch seating upon its respective end member.

4. A straw support comprising end members each having an outwardly projecting edge, one of said end members mounted for movement away from the other end member, a series of runners supported upon said end members and projecting outwardly therefrom, each runner having a pair of notches spaced apart along the runner and longitudinally parallel therewith, each notch being of sufficient length to span the width of the respective end member, a spur at the outer end of each of said notches, the spurs on each runner projecting obliquely towards each other, each spur engaging under the outwardly projecting edge of its corresponding end member, and said end members spaced apart to hold said spurs engaged therewith and to hold the longitudinal edge of each of said notches firmly seated upon its respective end member.

5. A straw support comprising end members each having an outwardly projecting edge, one of said end members mounted for movement away from the other end member, a series of runners supported upon said end members, a spur near each end of each runner, the spurs on each runner projecting towards each other and being spaced apart along the runner and intermediate the ends thereof each of said end members having a series of notches on its outer edge, each of said spurs disposed in one of said notches and engaged under the edge of the respective end member, said end members spaced apart to hold said spurs engaged in said notches and the terminal ends of said runners extending outwardly beyond said end members.

6. A straw support comprising end members each having an outwardly projecting edge, one of said end members mounted for movement away from the other end member, a series of runners supported upon said end members, a spur near each end of each runner, the spurs on each runner projecting obliquely towards each other and being spaced apart along the runner and intermediate the ends thereof each of said end members having a series of notches on its outer edge, each of said spurs disposed in one of said notches and engaged under the edge of the respective end member, said end members spaced apart to hold said spurs engaged in said notches, and the terminal ends of said runners extending outwardly beyond said end members.

7. A straw supporting runner comprising a channeled member, each wing of said channeled member having a pair of notches spaced apart along the edge thereof, each notch being of substantial length and arranged longitudinally parallel with the runner, a spur formed in the outer end of each of the respective notches, and each of said spurs projecting towards the inner end of its respective notch.

8. A straw supporting runner comprising a channeled member, a block near each end of said member and secured in the channel thereof, said blocks projecting from the channel, and each block forming a spur directed towards the other block.

9. A straw support comprising a frame having angle iron side rails, one wing of each side rail directed downwardly and the other wing thereof directed inwardly, an ear near the end of each of said downwardly directed wings and spaced apart from the respective inwardly directed wing, an angle iron end member disposed with one wing thereof directed outwardly in the spaces between said ears and said inwardly directed wings of said side rails, and the other wing of said end member projecting downwardly, bolts passed through the downwardly projecting wing of said end member and each bolt passed through one of said ears, and threaded engagement for said bolts for drawing said end member outwardly.

10. A straw support comprising a frame having angle iron side rails, one wing of each side rail directed downwardly and the other wing thereof directed inwardly, an ear near the end of each of said downwardly directed wings and spaced apart from the respective inwardly directed wing, an angle iron end member disposed with one wing thereof directed outwardly in the spaces between said ears and said inwardly directed wings of said side rails, and the other wing of said end member projecting downwardly, bolts passed through the downwardly projecting wing of said end member and each bolt passed through one of said ears, threaded engagement for said bolts for drawing said end member outwardly, an angle iron end member connecting the other ends of said side rails, the last said end member having a wing thereof directed outwardly, a series of runners supported upon said end members, inwardly directed spurs spaced apart upon each of said runners, and said spurs engaged with the outwardly directed wings of the respective end members.

AARON D. EDGINGTON.

CERTIFICATE OF CORRECTION.

Patent No. 2,165,888. July 11, 1939.

AARON D. EDGINGTON.

It is hereby certified that error appears in the printed specification of the above numbered patent requiring correction as follows: Page 3, second column, line 1, for the word "member" read members; line 6, for "pin" read pan; page 4, first column, line 72, and second column, line 13, claims 5 and 6 respectively, after "thereof" insert a comma; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.